United States Patent [19]

Torbet

[11] Patent Number: 4,891,884
[45] Date of Patent: Jan. 9, 1990

[54] HAND HOLDABLE AUTOMATIC BLADED APPLIANCE FOR SLICING, PEELING AND THE LIKE

[75] Inventor: Philip Torbet, 26 Centre View Dr., Upper Brookville, N.Y. 11771

[73] Assignees: Philip Torbet, Upper Brookville; William R. Hebel, Sands Point, both of N.Y.

[21] Appl. No.: 76,080

[22] Filed: Jul. 21, 1987

[51] Int. Cl.⁴ .............................................. B26B 7/00
[52] U.S. Cl. .................................... 30/277.4; 30/123.7
[58] Field of Search ..................... 30/272 A, 286, 287, 30/123.5, 123.6, 123.7

[56] References Cited

U.S. PATENT DOCUMENTS

| 2,830,368 | 4/1958 | Knoll et al. | 30/272 A |
| 3,303,563 | 2/1967 | Peterson | 30/272 A |
| 3,555,678 | 1/1971 | Agulnick et al. | 30/272 A X |
| 3,646,675 | 3/1972 | Wezel | 30/272 A |
| 4,631,827 | 12/1986 | Moores | 30/272 A |

FOREIGN PATENT DOCUMENTS

| 2743353 | 4/1979 | Fed. Rep. of Germany | 30/123.7 |
| 633678 | 10/1927 | France | 30/272 A |
| 318777 | 9/1929 | United Kingdom | 30/123.7 |

Primary Examiner—Frank T. Yost
Assistant Examiner—Michael D. Folkerts
Attorney, Agent, or Firm—Hedman, Gibson, Costigan & Hoare

[57] ABSTRACT

A light weight hand holdable appliance having a plurality of blade-like components for slicing peeling and the like. The appliance preferably is cordless and rechargeable and has a handle assembly within which is a high speed motor, a reciprocating mechanism and an interconnecting gear reduction and cam means for translating the high speed rotation of the motor to a powerful reciprocating stroke of the mechanism. The blade-like components include a knife having a thin single blade, particularly suitable for slicing, and a peeler having a thin single peeling blade and a guide spaced therefrom to facilitate peeling.

22 Claims, 8 Drawing Sheets

HAND HOLDABLE AUTOMATIC BLADED APPLIANCE FOR SLICING, PEELING AND THE LIKE

FIELD OF THE INVENTION

This invention relates to a hand holdable bladed appliance for automatic slicing, peeling and other tasks primarily relating to the preparation and use of food. More particularly this invention relates to a lightweight cordless, rechargeable appliance having a hand holdable power mechanism for reciporating a plurality of thin blade like components, e.g. knives, peelers etc., which are removably connected to the power mechanism.

BACKGROUND OF THE INVENTION

Prior to the present invention, there has been a need for a fast acting, easy to use and controllable hand held appliance for cutting, slicing, chopping and mincing foods, such as vegetables, fruits, etc.

While existing food processors may be desirable for many larger tasks, they are not as convenient for small tasks, such as cutting a few cucumbers or tomatoes. Also, food processors can not peel, e.g. vegetables and fruits, and are not useful in cutting or slicing bread. Further, food processors generally are relatively costly.

On the other hand, manual knives and peelers are not as quick or convenient as automatic appliances, and commonly do not provide the desired effortless control for slicing and peeling.

Moreover, existing automatic knives and the like have not filled the void. For many food products, such as vegetables and fruits, they are not particularly fast acting or easy to use and do not produce the desired results, e.g. thinly sliced vegetables and fruits.

Thus, existing means for slicing, peeling and the like are beset with drawbacks and have not met the persistent need for a relatively inexpensive, hand held automatic appliance which can quickly, easily and controllably slice, peel etc.

SUMMARY OF THE INVENTION

In accordance with the invention, there is provided a new and unique automatic bladed appliance for slicing, peeling and the like, which is particular adapted for food preparation and which is relatively inexpensive, fast acting, easy to use and controllable. The appliance comprises a light weight, compact handle assembly, preferably including there within a cordless, rechargeable, relatively powerful, reciprocating drive, and thin blade-like components adapted to be removably mounted to the mechanism for slicing, peeling etc. The power drive preferably includes a high speed electric motor, a reciprocating mechanism and a gear reduction and cam system therebetween. The appliance also can include a base for recharging the power supply during periods when the appliance is not in use or being stored.

The power system of the invention is relatively small or compact and is lightweight. In a preferred embodiment the power system includes a battery operated electric motor which through a gear reduction train, rotates a cylinder about an axis aligned generally parallel to the axis of a blade mounted to or in the reciprocating mechanism within the handle assembly. More particularly, the cylinder includes a cam extending around the outer periphery of the cylinder. The cam preferably includes a rib extending outwardly from and about the cylinder at an angle to the longitudinal axis of the cylinder. In turn, the cam engages the reciprocating mechanism for reciprocal movement thereof generally parallel to the longitudinal axis of the cylinder. The radius of the cylinder, the alignment of the cam thereon, and the breadth of the engaging means for the mechanism are designed to provide a relatively short, reciprocal stroke length.

The handle assembly of the appliance comprises a plastic housing for the compact lightweight power supply which is sized and contoured to be conveniently held and operated by hand.

The handle assembly also includes bearing means which provide a smooth reciprocating movement to the mechanism even in the presence of significant bending moments caused by the forces generated during slicing, peeling etc. The bearing means are disposed within the handle assembly and are in contact with the mechanism. Preferably, a plurality of bearings are provided. At least one bearing is disposed on the side of the reciprocating mechanism in proximity to the top or noncutting edge of the blade and at least one bearing is disposed on the side of the reciprocating in proximity to the bottom or cutting edge of the blade. The bearing in proximity to the noncutting edge of the blade preferably is disposed intermediate the blade tip and the other bearing. These relative positions of the bearings correspond to the reactions created by the bending moments imposed on the blade and on the reciprocating mechanism to which the blade is mounted. In one embodiment the bearings can be configured to rock back and forth in response to the reciprocal movement of the cam guide. The bearings can be configured to define at least portions of pinions that will engage portions of racks formed in the cam guide and in corresponding portions of the handle assembly. In another embodiment of the invention the bearings can be a plurality of pads which can comprise a plastic, such as synthetic resin sold under the trademark TEFLON.

The handle assembly of the present invention can be used to reciprocate a variety of blades or blade like components for cutting, slicing, peeling, chopping or mincing. The blades of the invention include a single bladed serrated knife for slicing bread and other low density food products, and a smooth surfaced single bladed knife preferably having a single beveled cutting edge, for slicing vegetables and fruits.

The blade-like components of the invention also can include a peeling blade and a guide. In one embodiment, the blade and guide are linear and the guide is disposed in fixed spaced parallel relationship, such that both the blade and guide reciprocate in unison. The shape and spacing of the blade and guide, when viewed in cross section, are selected to facilitate the passing of peels therebetween without jamming.

In another embodiment, the peeling blade and adjacent peeling guide are curved and are adapted to move through an arc which may approximate the accurate surface of many vegetables or fruits, such as cucumbers or apples. The accurate movement of the blade and the guide can be included in a substantially rigid housing which is attachable to the handle assembly for reciprocation of the peeling blade and guide.

Moreover, the single blades of the present invention, preferably are relatively small both in width and in height, and typically are made from metals, such as cutlery grade stainless steel. A single thin blade of the invention with its razor blade like thinness minimizes friction and requires relatively small amounts of force to provide a rapid and accurate slicing or peeling action. As a result the force delivered to the blade does not have to be large or significantly amplified by the user to achieve slicing, peeling etc. This allows the power-supply to be small or compact and lightweight and allows the user to proceed essentially effortlessly.

In another embodiment of the invention the blade-like components and/or their guides of the invention are releaseably secured to the reciprocating mechanism within the handle assembly by telescoping and bauonets type connections.

In each embodiment of the invention, the appliance includes a light weight handle assembly, preferably a cordless, electrically rechargeable, power mechanism, and relatively thin blade or blade-like components. The appliance is compact, powerful, fast acting, easy to use and controllable. The present invention provides in a single appliance an automatic, hand holdable device which readily and easily slices, peels, chops and minces a wide variety of food or food products

BRIEF DESCRIPTION OF THE DRAWING

The following is a detailed description of the present invention together with the drawings of illustrative embodiments of the invention. It is to be understood that the invention is capable of modification and variation apparent to those skilled in the art within the scope of the invention.

DETAILED DESCRIPTION OF THE PREFERRED EMBODIMENTS

Figure 1:
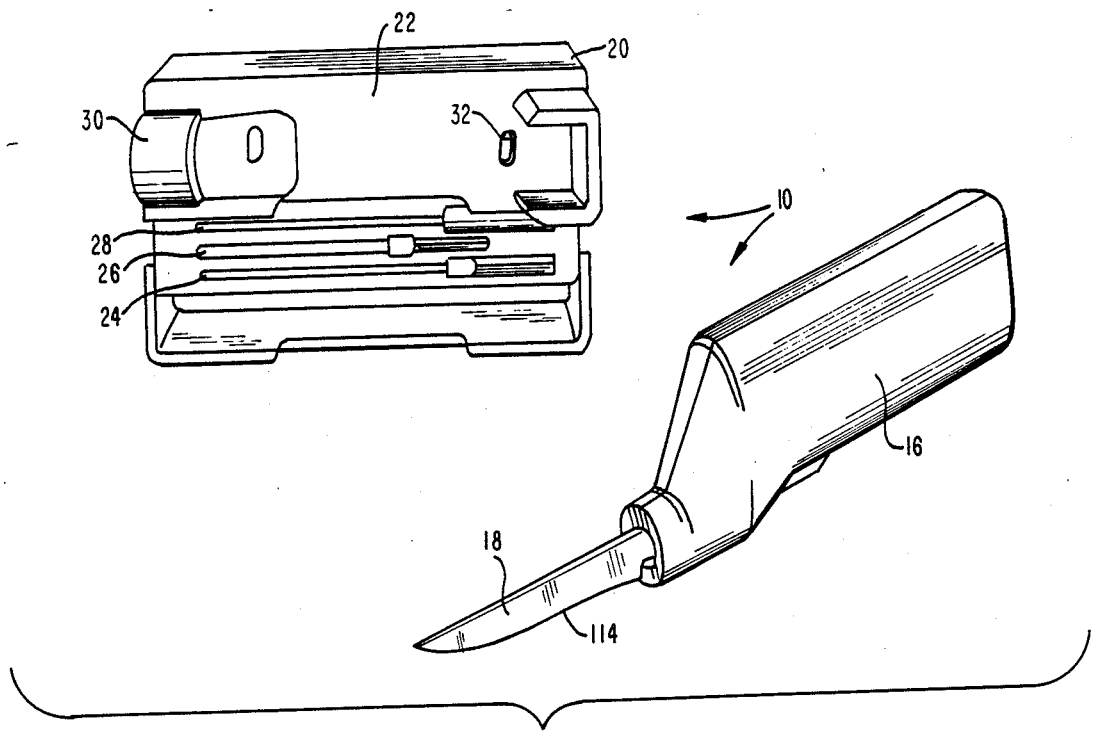
FIG. 1 is a perspective view of a preferred embodiment of the appliance of the present invention and its recharging base.

Referring to the drawings and first to FIGS. 1-4, there is shown one embodiment of the appliance 10 of the invention comprising a handle assembly 16 and a blade 18 replaceably mounted in the handle assembly 16. Blade 18 or other blade-like attachments are selectively insertable into the handle assembly upon removal of the previous attachment.

Figure 4:
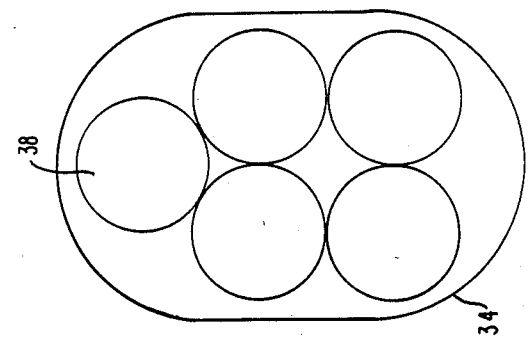
FIG. 4 is a cross sectional view, taken along line 4—4 of FIG. 3.
Figure 3:
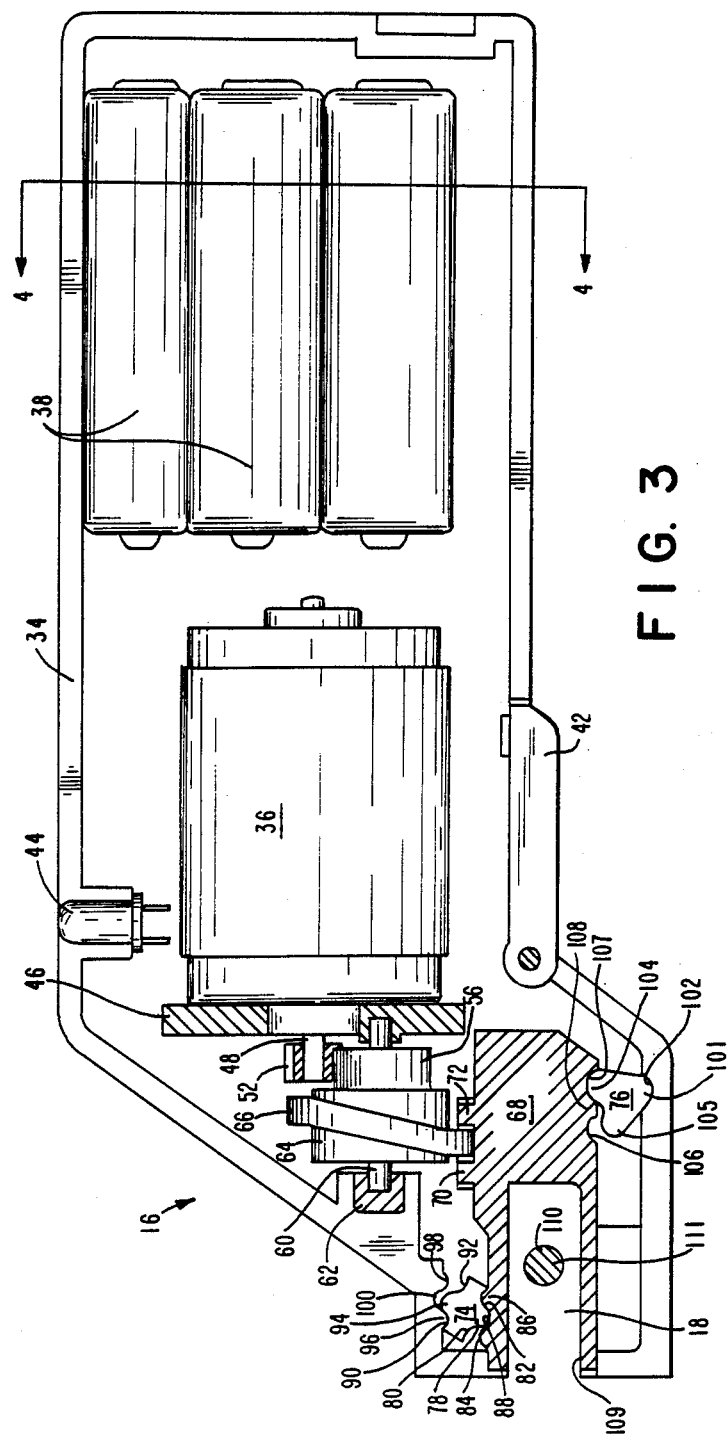
FIG. 3 is a longitudinal sectional view of the appliance of FIG. 1.

The handle assembly 16 and the blades 18 and 19 (FIGS. 5 and 5A) are specifically adapted to be received in a base 20 provided with a handle storage portion 22 portion and a plurality of blade storage portions 24, 26 and 28. The handle storage portion 22 includes a charging unit 30 which can be electrically connected to a standard electrical outlet (not shown). Additionally, the handle receiving portion 22 of the base 20 is adapted to make electrical contact with at least one terminal on the handle 16 for delivering a trickle charge to a rechargeable power supply, such as the five, double A 1.2 volt (6.0 volts) nickel-cadmium batteries within the handle assembly 16 (FIGS. 3 and 4). The base 20 is further provided with one or more mounting apertures 32 to permit the base 20 to be conveniently mounted to a wall in proximity to an electrical outlet for convenient storage during recharging.

Figure 2:
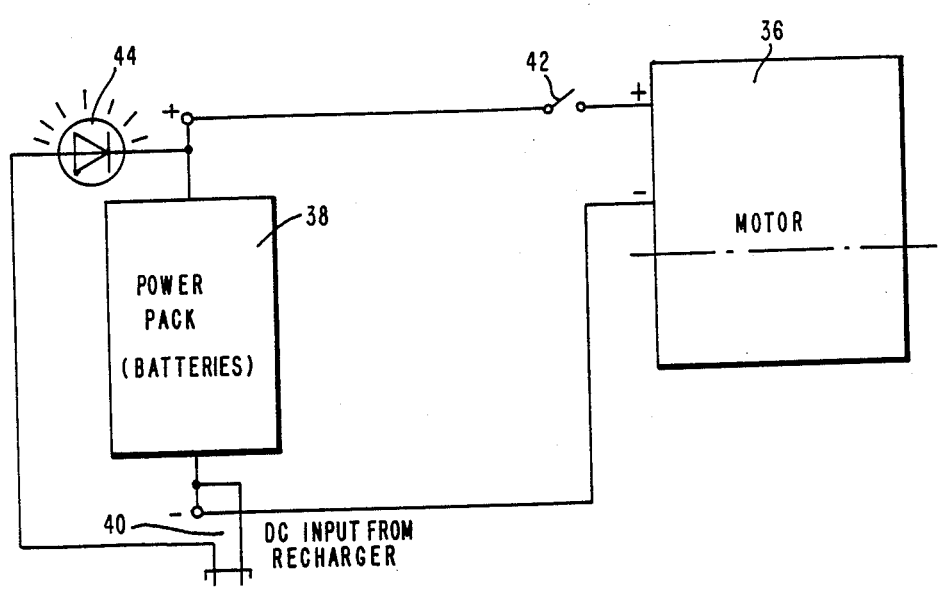
FIG. 2 is a block diagram of the electrical circuit for operating the power mechanism of the appliance illustrated in FIG. 1.

The handle assembly 16 of the appliance 10 is illustrated in greater detail in FIGS. 3 and 4, with the electric circuitry shown schematically in FIG. 2. More particularly, the handle assembly 16 comprises a rigid two part housing 34 formed from a plastic material, such as ABS copolymers (acrylonitrile, butadiene and styrene). The handle assembly 16 further comprises a 11,000 RPM electric motor 36 securely mounted within the housing 34. The electric motor 36 is operatively connected to rechargeable nickel-cadmium batteries 38 within the rearward portion of the housing 4. The handle assembly 16 also includes terminal 40 which is electrically connected to the batteries 38 to permit recharging (FIG. 2).

The handle assembly 16 further comprises a diode 44 which can be a light emitting diode. The light source 44 is operatively connected to the batteries 38 to indicate that the batteries 38 are being charged. The electric motor 36 also is operatively connected to a switch 42 pivotally mounted to the housing 34 and electrically connected to the motor 36. The switch 42 is operative to selectively deliver a flow of current from the batteries 38 to the motor 36 to operate the motor 36.

The motor 36 is rigidly mounted to support 46 which, in turn, extends from the housing 34 of the handle assembly 16. The motor 36 comprises a drive shaft 48 which extends through the support 46 and terminates within pinion gear 52.

The handle assembly 16 further comprises a reduction gear 56 which includes an array of teeth which are engaged with the teeth of the gear 52. The gear 56 is rigidly mounted to an axle 60 which in turn is rotatably mounted to the support 46 at one end and to a bushing 62 at its opposed end in the forward portion of the housing 34. The axle 60 extends substantially parallel to the drive shaft 48. As a result, the rotation of the drive shaft 48 under the action of motor 36 will cause rotation of the gears 52 and 56 respectively.

A cylinder 64 is rigidly mounted to both the axle 60 and the gear 56 with its longitudinal axis substantially coincident with the axle 60. Thus, the cylinder 64 is rotatably drivable about its longitudinal axis under the action of the motor 36 acting through the above described interengaged gears. In this embodiment the gear reduction causes the cylinder 64 to rotate at 5500 RPM. A cam 66 extends rigidly from the outer circumferential surface of the cylinder 64. The cam 66 is a generally annular nonplanar structure which is aligned at an angle to the longitudinal axis of the cylinder 64 and which as shown in FIG. 3, generally has a sinusoidal configuration.

The handle assembly 16 further comprises a cam follower or reciprocating mechanism 68 slidably mounted in the opened nose or reduced portion of the housing 34. The mechanism 68 includes a pair of spaced apart cam guides 70 and 72 disposed respectively on opposed sides of the cam 66 so that the cam 66 is positioned within the recess between the guides or posts 70 and 72. As a result of the engagement between the guides 70 and 72 and the cam 66, the guides 70 and 72 will cause the mechanism 68 to undergo reciprocal movement while following the rotation of the cam 66. In particular, the angular alignment of the cam 66 illustrated in FIG. 3 will cause the mechanism 68 to be urged its maximum to the left in FIG. 2. Conversely, a 180° rotation of the cylinder 64 will move the mechanism 68 in its maximum distance toward the right. The relative dimensions and angular alignment of the cylinder 64 and cam 66 are selected to achieve the desired movement or stroke length of the mechanism 68, which typically can be from about 0.10 to about 0.20 inch, and preferably about 0.125 inch. In each embodiment the reciprocal movement of the mechanism is fast. In the illustrative embodiment the mechanism 68 reciprocates at a speed of 5500 strokes per minute.

The reciprocating movement of the mechanism 68 is smoothly guided by bearings such as pinion bearings 74 and 76 (FIG. 3). The pinion bearings 74 and 76 are configured to function as portions of pinion gears to engage corresponding portions of racks formed in the housing 34 and the mechanism 68. The bearing 74 includes a convex portion 78 and a pair of concave portions 80 and 82 respectively. The mechanism 68 includes a pair of spaced apart convex rack portions 84 and 86 and a concave portion 88 therebetween to effectively define teeth. In a similar manner, the opposite side of the pinion bearing 74 includes a pair of concave portions 90 and 92 and a convex portion 94 therebetween. These portions of the pinion bearing 74 are configured and dimensioned to rotate into engagement with convex rack portions 96 and 98 of housing 34 and a concave portions 100 therebetween which also effectively define teeth to engage the concavely accurate portions of the pinion bearing 74.

The pinion bearing 76 includes an accurate convex surface 101 which engages a concave portion 102 of housing 34. The opposite side of pinion bearing 76 is characterized by a pair of convex portions 103 and 104 and a concave portion 105 therebetween, which engage corresponding concave rack portions 106 and 107 and convex rack tooth portion 108 if the mechanism 68.

The pinion bearings 74 and 76 guide the mechanism 68 through a reciprocating movement parallel to the drive shaft 48 and under the action of cam 66. More particularly, in the maximum forward position of the mechanism 68, as illustrated in FIG. 3, the convex portion 104 if pinion bearing 76 will engage the concave rack portion 107 of cam follower 68 to hold the mechanism 68 in the proper spaced relationship relative to the housing 34. Simultaneously, the concave portions 82 and 90 of the pinion bearing 74 will respectively engage the convex rack portions 86 and 96 of the cam follower 68 and housing 34.

As the cam 66 rotates 180°, the pinion bearing 76 will rotate clockwise about a location between housing 34 and mechanism 68, such that the convex portion 103 will engage the concave rack portion 106 to continue to maintain the mechanism 68 in the proper spaced relationship to the housing 34. Similarly, the convex portion 98 of housing 34 will be urged into the concave portion 92 of the pinion bearing 74 while the convex rack portion 84 of mechanism 68 will be urged into the concave portion pinion bearing 74. As the cam 66 continues to rotate, a smooth reciprocating movement of the cam follower 68 will be achieved by this continuous and reversing rotation carried out by the pinion bearings 74 and 76. This configuration of pinion-like bearings and rack-like supports provides for smooth movement of the mechanism 68.

The illustrated configurations of the pinion bearings 74 and 76 are not necessarily dictated by their respective locations. Thus, with only minor structural changes to the housing 34, the pinion bearings 74 and 76 could be reversed, or both could be identical. It must be emphasized, however, that the relative postions of the pinion bearings 74 and 76 are important. In particular, the bearings 74 and 76 are positioned to provide support against a clockwise moment about the mechanism 68 caused by the forces exerted during cutting, slicing, etc. Specifically, the bearing opposite the cutting edge of the blade is nearest the tip of the blade.

The mechanism 68 further comprises a slot 109 in its front portion adjacent the nose or forward portion of the housing 34 for slidably receiving correspondingly shaped roots or tails of the blades 18 etc. of the invention. As shown if FIG. 3, 5 and 6, the blades 18 and 19 include an aperture 110 in their tail ends and the mechanism 68 includes a spring biased detent 111 for releasably securing the blades within the mechanism 68.

Figure 7:
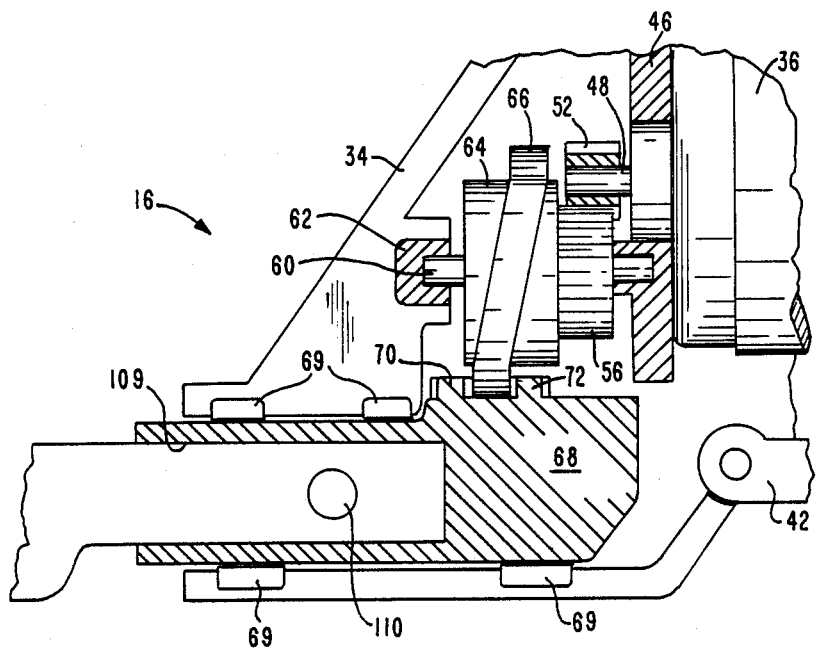
FIG. 7 is an enlarged longitudinal sectional detail of the drive mechanism of the appliance of FIG. 2, except that it includes another embodiment of the bearings of the present invention.

In FIG. 7, there is shown another embodiment of the handle assembly 16, wherein the bearings for the mechanism 68 are bearing pads 69 which engage and support the mechanism 68 as it reciprocates. As illustrated this embodiment includes four bearing pads which can be made from plastics, such as synthetic resins sold under the trademark TEFLON.

In each illustrative embodiment of the invention the power drive within the handle assembly 16 is compact or small and is lightweight correspondingly the housing 34 is relatively small and contoured to be conveniently held and aperated by hand. Typically the handle assembly 16 can be about 6.5 inches in length and about 2.00 inches in height in its body and 1.00 inch in height at its nose or forward portion.

Figures 5, 5A:
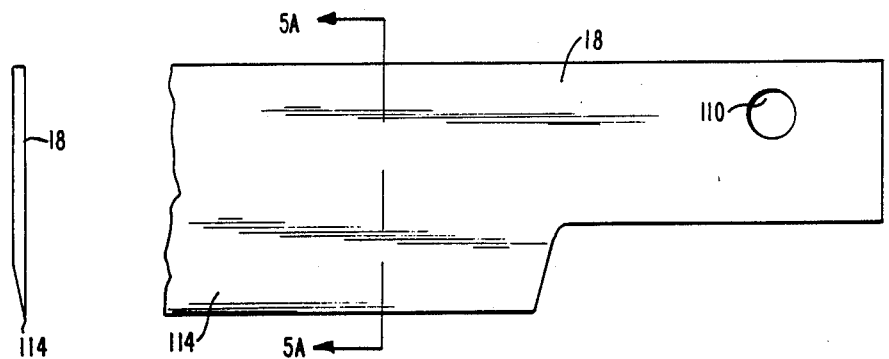
FIG. 5 is an elevational view of a portion of a preferred embodiment of a straight blade of the present invention for attachment to the appliance of FIG. 1.
FIG. 5A is a cross-sectional view, taken along line 5—5 of FIG. 5.

As noted previously, the blades of the present invention are adapted to be interchangeably inserted into the reciprocating mechanism 68. As shown in FIGS. 1, 5 and 5A a single blade 18 having a substantially smooth cutting edge 114 is mounted in the handle assembly 16. In the illustrative embodiment the single blade 18 typically can have a thickness of from about 0.015 inch to about 0.035 inch and preferably about 0.025 inch. By using a single thin blade 18 within, the frictional forces on the blade and the required forces to be exerted on the handle are minimized. Similarly, the blade 18 typically can have a height of from about 0.325 inch to about 0.625 inch and preferably about 0.50 inch. Also, in the illustrative embodiment the blade 18 is made of cutlery stainless steel and has a length of about 4.0 inches. Preferably, the cutting edge 114 of blade 18 includes a taper or bevel of about 15 degrees in one side of the blade 18, thereby keeping the opposite side of the blade 18 substantially planar along its entire length. In use the beveled side of the blade 18 preferably is toward the cut or slice to provide slices of the desired thickness. The illustrative blade 18 of the invention can be used to slice, chop and mince vegetables and fruits.

Figures 6, 6A:
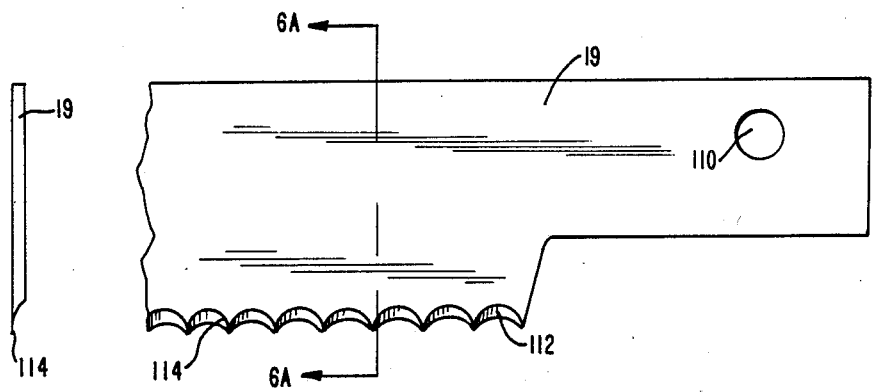
FIG. 6 is an elevational view of a portion of a preferred embodiment of a serrated blade of the of the present invention attachment to the appliance of the present invention.
FIG. 6A is a cross-sectional view, taken along line 6—6 in FIG. 7.

As shown in FIGS. 6 and 6A the blades of the present invention also include a thin, single blade 19 having a plurality of serrations 112 and a bevel on one side defining its cutting edge 114. As with the blade 18, blade 19 is insertable into the mechanism 68 and releasably secured to the handle assembly 16 by the intergagement between the detent 111 of the mechanism 68 and the aperture 110 in the end of the blade 19. The blade 19, typically, can be used to cut or slice material having a low density, such as bread.

When the user desires to change blades the user simply pulls on the blade, whereupon the detent 111 releases the blade and the mechanism 68 is ready to receive another blade.

With the very thin single blades of the present invention, friction and back pressure incurred in slicing, peeling etc., are minimized. Consequently the power needed to drive the blades is kept at a minimum. For example, the power drive in the illustrative embodiments delivers about 8 ounce of force for each stroke of the blades. With the thinness of the blades and at this force level, the appliance 10 easily slices, peels etc. without any meaningful additional force. This allows the user to proceed with a minimum of effort while holding the compact and lightweight handle assembly 16. From a power point of view, moreover, the appliance 10 is powerful in that it delivers the force needed to operate the blades essentially without requiring additional force from the user. The blades of the invention, in essence, simply must be kept in contact with the item being processed and the reciprocating blade does the rest.

Figure 8:
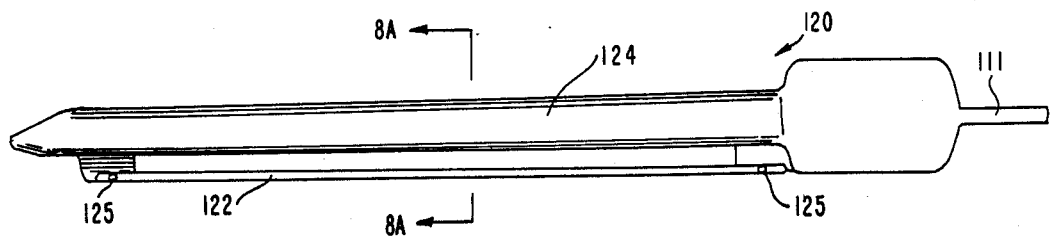
FIG. 8 is a elevational view of a preferred embodiment of a peeler of the present invention for attachment to the appliance of FIG. 1.
Figure 8A:
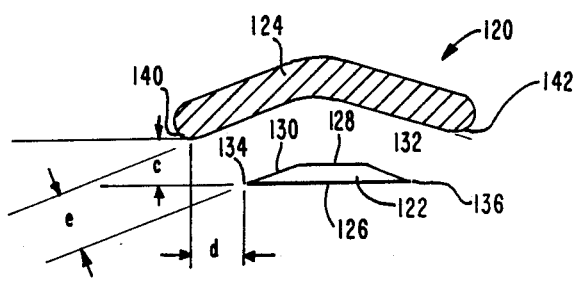
FIG. 8A is a cross-sectional view, taken along the lines 8A-8A in FIG. 8.
Figure 8B:
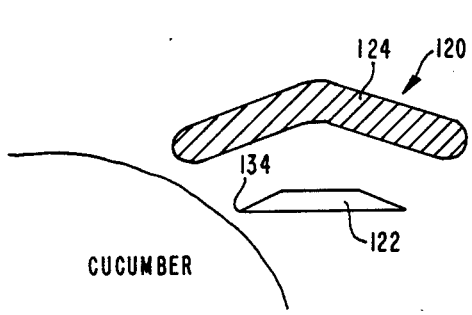
FIGS. 8B, 8C and 8D are equential details in cross section, pictorially showing a typical peeling with the peeler of FIG. 8.

Another blade like component of the present invention is an automatic peeler, such as the peeler 120 shown in FIGS. 8 and 8A–D. The peeler 120 comprises a blade 122 and a cutting guide 124. The blade 122 is secured in spaced relationship to the cutting guide 124 by suitable means, such as rivets 125, so that the blade 122 and cutting guide 124 reciprocate in unison under the action of the reciprocating mechanism 68. The blade 122 is of generally trapezoidal cross section as shown in FIG. 8 A–D. More particularly, the blade 122 includes opposed major and minor parallel sides 126 and 128 and a pair of beveled sides 130 and 132. Thus, a first cutting edge 134 is defined at the intersection of beveled side 130 and the major parallel side 126, while a second cutting edge 136 is defined by the intersection of the second beveled side 132 with the major parallel side 126. The blade 122 is oriented such that the minor parallel side 128 and the beveled sides 130 and 132 face the cutting guide 124.

The cutting guide 124 includes a generally accurate guide surface 138 which generally follows the contour defined by the minor parallel side 128 and the beveled sides 130 and 132 of the blade 122. The guide surface 138 terminates at convex guide edges 140 and 142. The respective cross-sectional shapes and the spacings between the blade 122 and the cutting guide 124 is selected to achieve both an efficient cutting of the material to be peeled and an efficient guiding of the peel through the peeling attachment 120. The maximum thickness of the peel will be determined by the dimension "c" shown in FIG. 8A which defines the distance between the guide edges 140 or 142 and the major parallel side 126. Illustratively the distance "c" will be about 0.070 inch. To ensure that the peel does not jam, the distance between the cutting edge 134 or 136 and the corresponding guide edges 140 or 142, as indicated by dimension "d" is at least about equal to the dimension "c" e.g. 0.070 inch. Additionally, the height of the channel between the blade 122 and the cutting guide 124, as indicated by dimension "e" preferably is greater than the maximum peel thickness, as indicated by dimension "c", e.g. 0.100 inch.

Figure 8C:
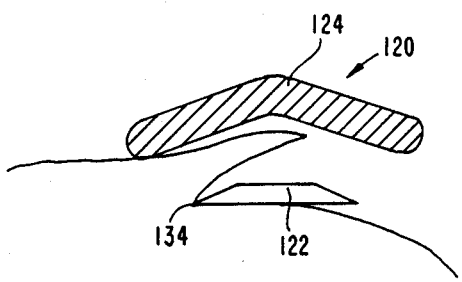
Figure 8D:
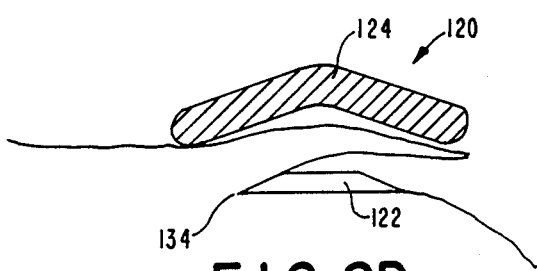

In operation the peeler 120 is inserted into the mechanism 68 wherein the detent 110 moves into the aperture 111 and secures the peeler 120 in place. The user can then depress switch 42 to operate the power drive. The recessed cutting edge 134 of the reciprocating peeling blade 122 is brought into contact with the product to be peeled, e.g. a cucumber, whereupon the reciprocating blade 122 cuts a peel to a thickness which essentially is equal to the dimension "c". Moreover, by having the cutting edge 134 recessed within the reciprocating guide 124, the desired peeling is readily obtained with the peel passing between the blade 122 and 124 and egressing therefrom (FIGS. 8C and 8D).

Figure 9A:
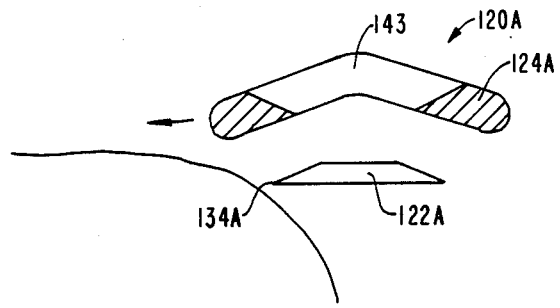
FIGS. 9A-9C are similar to FIGS. 8B-D, illustrating a typical peeling with a peeler like the one illustrated in FIG. 8, except that the guide includes an opening for the egress of the peels.
Figure 9B:
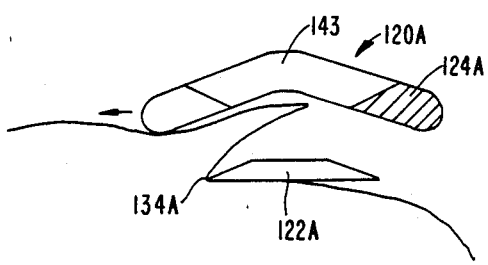
Figure 9C:
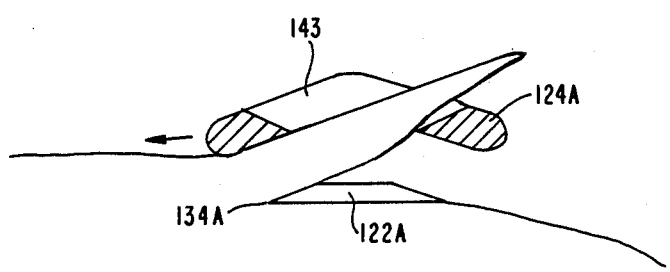

In FIGS. 9A–9C, there is illustrated another embodiment of the peeler 120A. In this instance the peeler 120A is the same as the peeler 120, of FIG. 8 and 8A–D, except that the peeler 120A includes an opening 143 in the guide 124A which extends along the length of the central portion of the guide 124A. The peeler 124A also operates the same as the peeler 120, except that the peel cut by the blade 122A egresses through the opening 143 as illustrated in FIG. 9A–9C.

Figure 11:
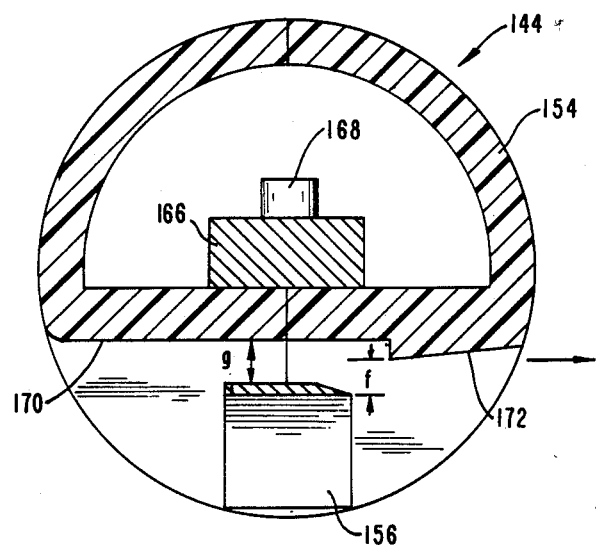
FIG. 11 is a cross-sectional view, taken along line 11—11 in FIG. 10.
Figure 10:
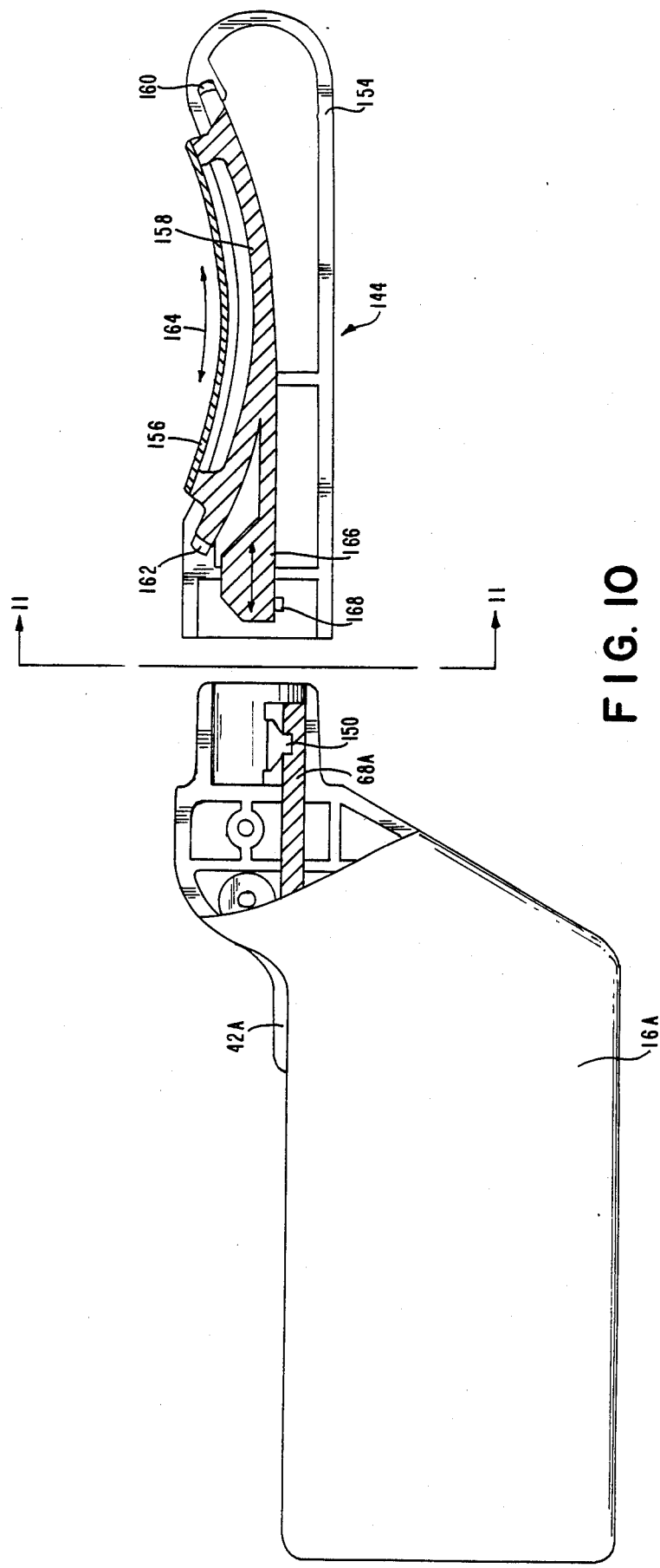
FIG. 10 is an elevational view of another embodiment of an appliance of the present invention, including a curved peeler and a guide.

With reference to FIGS. 10 and 11, the peeler 144 includes a housing 154 which is rigidly but removably mounted to the handle assembly 16A. The housing 154 does not reciprocate during the peeling action. The peeler 144 further comprises a curved blade 156 and a curved blade carrier 158. The blade carrier 158 is slidably retained in guides 160 and 162 of the housing 154 to undergo an accurate reciprocating movement as indicated by the arrow 164 in FIG. 10. The blade carrier 158 comprises an integral flexible connecting member 166 which includes a pin or lug 155 at its terminal end.

In this embodiment, the reciprocating mechanism 68A within the handle assembly 16A includes a slot 150 within its wall. As is apparent from FIG. 10, the connecting member 166 will extend into the nose of the handle assembly 16A and the pin 155 will be engaged in the groove 150 which enables the linear movement of the blade carrier pin 168 to be converted into the accurate movement of the blade carrier 158 and the curved blade 156.

As shown in FIG. 11, the housing 154 functions as a nonreciprocatring guide relative to the curved reciprocating blade 156. The housing 154 includes a guide surface 170 which extends generally parallel to the blade 156. Additionally, the housing 154 includes a leading edge 172 which is stepped relative to the surface 170. The distance "f" between the blade 156 and the leading edge 172, as measured perpendicular to the blade 156 defines the maximum thickness of the peel. However, the distance between the blade 156 and the surface 170, as indicated by dimension "g" exceeds the dimension "f". As a result, a peel of maximum thickness "f" will easily pass through the space or dimension "g" provided between the blade 156 and the surface 170.

Figure 12:
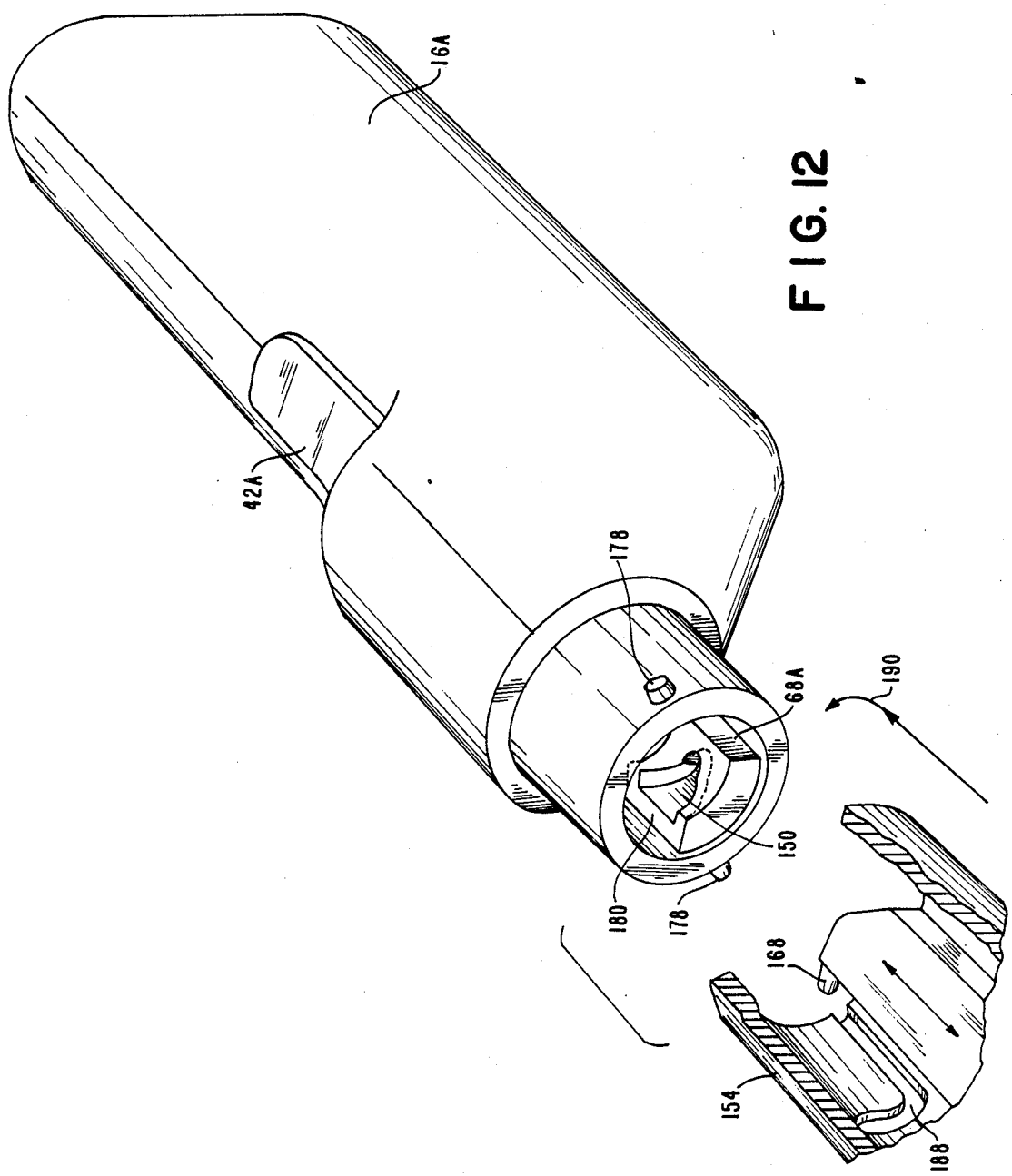
FIG. 12 is a perspective of appliance of and the attaching portion of the peeler of FIG. 10, broken away to illustrate the type of connection therebetween.

Certain of the attachments to the appliances of the invention, such as the previously described peeler attachment 144, may comprise a blade which reciprocates relative to a stationary guide or housing. With these attachments it is important that both the reciprocating blade and the stationary housing be securely and easily mounted to the handle assembly to reset the bending moments that are likely to be created during operation. The ease of mounting is complicated by the fact that the cutting member may be anywhere in its possible range of movement when the connection is attempted. To achieve these objectives, the appliances of the invention can include a double, generally telescoping, bayonet connection (only partially shown in FIGS. 10 and 11). More particularly, as illustrated in FIG. 12, the handle assembly 16A includes a generally accurate mechanism 68A disposed within the nose of the assembly for reciprocating movement relative thereto under the action of the previously described thereto under the action of the previously described power drive. In this embodiment the nose is provided with a pair of outwardly extending bayonet lugs 178. Correspondingly, the forward end of the mechanism 68A is provided with a longitudinally aligned surface 180 into which the inwardly facing slot 150 is formed. The slot 150 effectively defines a tapered ramp having a wide opening adjacent surface 180 and a relatively narrow seat 181.

The attachment, peeler 144 or otherwise, is identified by the housing 154. The stationary cylindrical outer housing 154 of the attachment 144 has an inside diameter substantially equal to or slightly greater than the outside diameter of the cylindrical nose of the assembly 16. Additionally, the inner surface of the cylindrical housing 154 is provided with inwardly facing slots 188 which are dimensioned and disposed to receive the bayonet lugs 178 of the handle assembly 16A. As shown in FIG. 12, the configuration of the slots 188 permits the outer cylindrical housing 154 to telescopingly slide over the nose while with the lugs 178 advance longitudinally in the slots 188. When the lugs 178 advance their maximum longitudinal ditance within the slots 188, the attachment 144 may be rotated as indicated by arrow 190 as the lugs 178 move in the curved portion of the slots 180 to positively retain the housing 154 in its nonreciprocating position on the handle assembly 16A.

At the same time the lug or pin 168 is adapted to be received within the slot 150 in the mechanism 68A. The relative angular positions of the lug 168 and the slots 188 on attachment 144 correspond to the relative angular positions of the lugs 178 and the surface 180 on the mechanism 68A. Thus, the lug 168 will be in position to be rotated into the slot 150 of the mechanism 68A as the lugs 178 are rotated into the curved portions of slots 188. The converging configuration of the mechanism slot 150 ensures that the lug 168 will be received therein regardless of the relative position of the connecting member 166 in its range of reciprocating movement. Thus, the simultaneous bayonet attachments of two telescoping members are achieved, with relative longitudinal movement between the pairs of interconnected members being possible.

Figure 13:
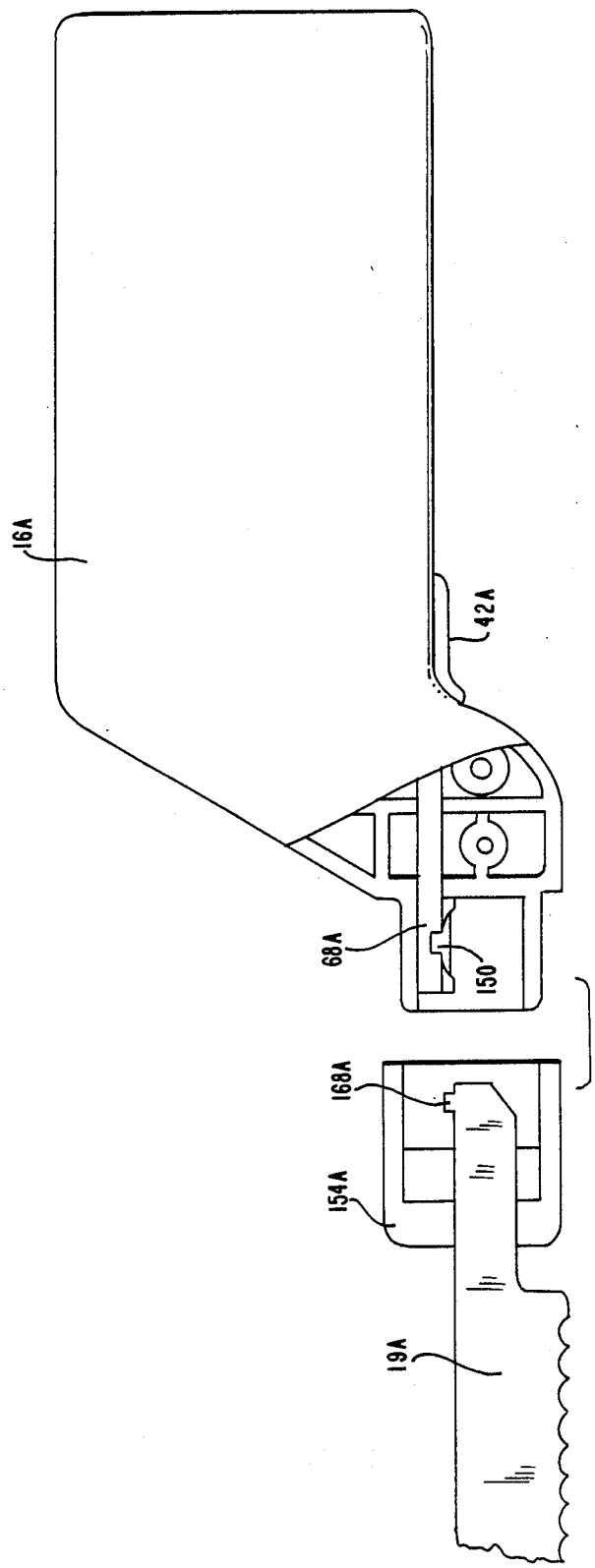
FIG. 13 is similar to FIG. 10 except that blade attachment includes a straight-bladed serrated knife.

Moreover, this embodiment of the attachment between the blade-like components and the handle assembly can be used for straight blades as illustrated in FIG. 13. In this instance the tail end of the blade 19A is mounted in the abbreviated cylindrical housing 154A and includes a lug 168A extending therefrom within the housing 154A. In operation the housing 154A slidably telescopes over the nose of the handle assembly 16A as the lugs and slots interengage as previously described with reference in FIG. 12.

In each embodiment of the present invention the desired blade is inserted into the lightweight, compact handle assembly of the appliance. Then the user depresses the switch and turns the appliance on. Through the cordless and rechargeable power drive (batteries, motor, gears, cylinder and cam), the reciprocating mechanism quickly delivers substantial power to and rapidly reciprocates the selected blade for slicing, peeling, chopping, mincing or other tasks. After each task the user simply releases the switch to halt the power drive, readily pulls the blade from the hand assembly and, if desired, inserts another blade, and the appliance is ready to preform its next task. Thus, in a single automatic bladed appliance the user can perform a number of different tasks, primarily relating to the preparation of food, with a minimum of effort.

While the invention has been described with respect to certain preferred embodiments, it is apparent that various changes can be made without departing from the scope of the invention as defined by the appended claims.

I claim:
1. An automatic appliance for peeling, comprising:
    a light weight handle assembly for conveniently holding the appliance,
    a power system within said handle assembly including a power supply comprising a cylinder mounted within said handle assembly for rotation about the longitudinal axis of said cylinder and including a cam extending from and about said cylinder and which is aligned at an angle to said longitudinal axis,
    a gear reduction means connecting said cylinder to a motor for rotation of said cylinder at a speed which is substantially less than the speed of said motor, a reciprocating mechanism including means for engaging said angular cam to effect rapid reciprocal movement of said mechanism as said cylinder is rotated by said motor and which is operatively connected to and reciprocated by said power supply to provide a fast acting, rapid and powerful reciprocation to said mechanism, and
    a single thin blade-like peeler including a cutting guide and a blade spaced from the cutting guide, said blade defining a pair of cutting edges extending longitudinally along opposite sides of said blade adapted to be releasably connected to said mechanism for peeling.
2. The automatic appliance of claim 1 wherein said appliance is cordless and said power supply includes a high speed electric motor and rechargeable batteries operatively connected to said motor.

3. A automatic appliance of claim 1, wherein said blade is of generally trapezoidal cross section with opposed parallel major and minor width surfaces and a pair of beveled surfaces extending therebetween such that the intersection of said beveled surfaces and said major surface define the respective cutting edges of said blade, said blade being disposed such that the minor surface thereof faces the cutting guide of said peeler.

4. The automatice appliance of claim 3 wherein said cutting guide includes an elongated guide surface having a generally concave configuration from side to side and defining a side to side with which exceeds the distance between the opposed cutting edges of said blades.

5. The automatic appliance of claim 4 wherein said cutting guide is spaced from the plane of the major surface of said blade.

6. The automatic appliance of claim 1 wherein said peeler includes a housing adapted to be attached to said handle assembly adjacent said reciprocating mechanism, and a curved peeler blade reciprocably mounted to said housing and operatively connected to said mechanism for reciprocation thereof.

7. The automatic appliance of claim 1 wherein the blade-like peeler includes a housing for said blade, and said housing and handle assembly include telescoping bayonnet connections therebetween for releasably and operatively connecting the blade to said reciprocating mechanism.

8. An automatic appliance for slicing, peeling and the like, comprising:
   a light weight handle assembly for conveniently holding the appliance,
   a power system within said handle assembly including a power supply, a rciprocating mechanism operatively connected to and reciprocated by said power supply to provide a fast acting, rapid and powerful reciprocation to said reciprocating mechanism, and
   a thin blade-like component adapted to be releasably connected to said reciprocating mechanism, said peeler comprising a cutting guide and a blade spaced from said cutting guide, said blade defining a pair of cutting edges extending longitudinally along the opposite side of the blade and having a generally trapezoidal cross section with opposed major and minor with surfaces and a pair of beveled surfaces extending therebetween such that the intersection of said beveled surfaces and said major surface define the respective cutting edges of the blade, said blade being disposed such that the minor surface thereof faces the cutting guide of said blade-like component, said cutting guide including an elongated guide surface having a generally concave configuration from side to side and defining a side t side width which exceeds the distance between the opposed cutting edges of said blade, and wherein said cutting guide is spaced from the plane of the major surface of the blade and has a pair of longitudinally extending side edges with each edge extending laterally beyond the corresponding cutting edge by a distance greater than the distance between the cutting guide and the plane of the major surface of the blade.

9. The automotive appliance of claim 8 wherein said appliance is cordless and said power supply includes a high speed electric motor and rechargeable batteries operatively connected to said motor 10. The automatic appliance of claim 9 wherein said power supply further comprises:
    a cylinder mounted within said handle assembly for rotation about the longitudinal axis of said cylinder and includes a cam extending from and about said cylinder and is aligned at an angle to said longitudinal axis,
    a gear reduction means connecting said cylinder to said motor for rotation of said cylinder at a speed which is substantially less than the speed of said motor, and
    wherein in said reciprocating mechanism includes means for engaging said annular cam to effect rapid reciprocal movement of said mechanism as said cylinder is rotated by said motor.

11. The automatic appliance of claim 8 wherein said blade-like component comprises a single, thin, knife blade for slicing.

12. The automatic appliance of claim 11 wherein said single, thin, knife blade has one beveled cutting edge positioned toward the slice to facilitate its slicing action.

13. The automatic appliance of claim 8 wherein said blade-like attachment includes a housing adapted to be attached to said handle assembly adjacent said reciprocating mechanism, and a curved peeler blade reciprocating mounted to said housing and operatively connected to said mechanism for reciprocation thereof.

14. The automatic appliance of claim 8 wherein the blade-like component includes a housing for a blade, and said housing and handle assembly include telescoping bayonnet connections therebetween for releasably and operatively connecting the blade to said reciprocating mechanism.

15. An automatic appliance for slicing, peeling and the like, comprising:
    a light weight handle assembly for conveniently holding the appliance,
    a power system within said handle assembly including a power supply, a reciprocating mechanism operatively connected to and reciprocated by said power supply to provide a fast acting, rapid and powerful reciprocation to said mechanism, said power supply comprising:
    a cylinder mounted within said handle assembly for rotation about the longitudinal axis of said cylinder and includes a cam extending from and about said cylinder and is aligned at an angle to said longitudinal axis,
    a gear reduction means connecting said cylinder to said motor for rotation of said cylinder at a speed which is substantially less than the speed of said motor, and
    wherein said reciprocating mechanism includes means for engaging said angular cam to effect rapid reciprocal movement of said mechanism as said cylinder is rotated by said motor, said appliance further comprising;
    a thin blade-like component adapted to be releasably connected to said mechanism for slicing, peeling or the like; and
    bearings in operative engagement with the reciprocating mechanism to provide support for the reciprocating mechanism.

16. The automatic appliance of claim 15 wherein said appliance is cordless and said power supply includes a high speed electric motor and rechargeable batteries operatively connected to said motor.

17. The automatic appliance of claim 15 wherein said blade-like component comprises a single, thin, knife blade for slicing.

18. The automatic appliance of claim 17 wherein said single, thin, knife blade has only one beveled cutting edge which is to be positioned toward the slice to facilitate its slicing action.

19. The automatic appliance of claim 15 wherein said blade-like component is a peeler including a cutting guide and a blade spaced from said cutting guide.

20. The automatic appliance of claim 15 wherein said blade-like component is a peeler, including a housing adapted to be attached to said handle assembly adjacent said reciprocating mechanism, and a curved peeler blade reciprocably mounted to said housing and operatively connected to said mechanism for reciprocation thereof.

21. The automatic appliance of claim 15 wherein the blade-like component includes a housing for a blade, and said housing and handle assembly include telescoping bayonnet connections therebetween for releasably and operatively connecting the blade to said reciprocating mechanism.

22. The automatic appliance of claim 15 wherein said bearings comprise pinion bearings in operative engagement with the reciprocating mechanism to provide support against a rotation movement about said mechanism as a result of the forces exerted during said slicing, peeling or the like.

* * * * *